J. B. MacDONALD.
TRACTION BOAT.
APPLICATION FILED DEC. 20, 1917.
1,345,326.
Patented June 29, 1920.
2 SHEETS—SHEET 1.
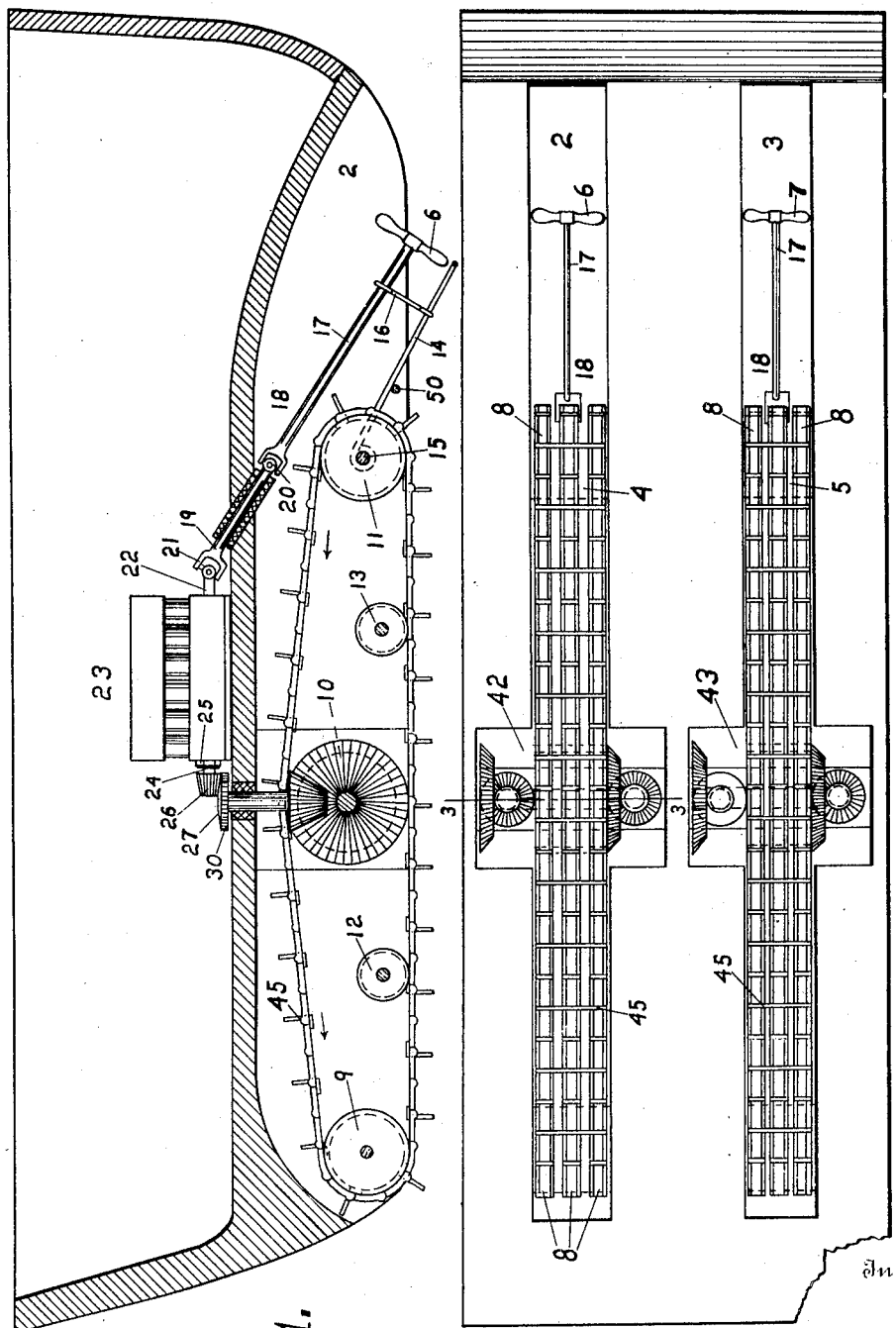

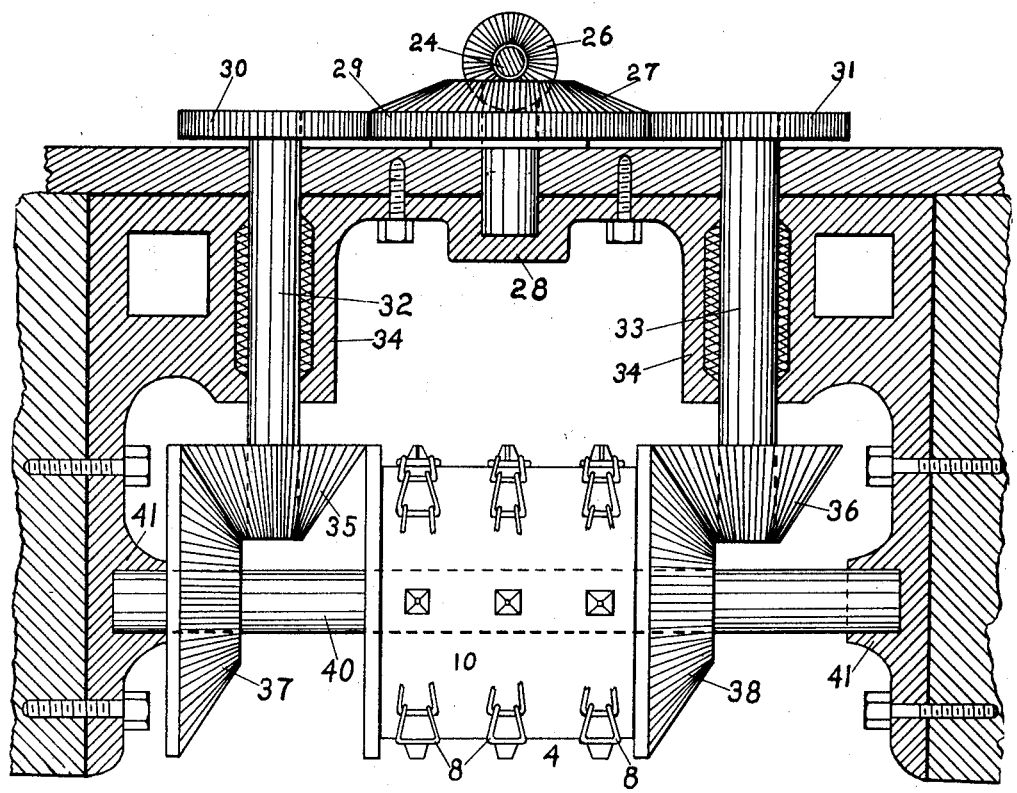
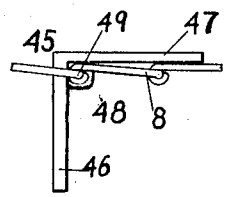
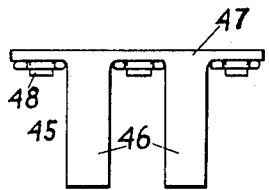
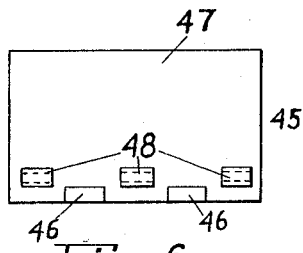

UNITED STATES PATENT OFFICE.

JACK B. MacDONALD, OF OAKLAND, CALIFORNIA.

TRACTION-BOAT.

1,345,326.

Specification of Letters Patent. Patented June 29, 1920.

Application filed December 20, 1917. Serial No. 208,155.

*To all whom it may concern:*

Be it known that I, JACK B. MACDONALD, citizen of the United States, residing at Oakland, in the county of Alameda and State of California, have invented certain new and useful Improvements in Traction-Boats, of which the following is a specification.

My invention is a traction boat for traveling over river bottoms in shallow water or over land when desirable.

In this specification and the annexed drawing, I disclose my invention in the form which I consider the best, but I do not limit my invention to such form because it may be embodied in other forms, and it is to be understood that in and by the claims following the description herein, I intend to cover my invention in whatever form it may be embodied.

Referring to the drawings:

Figure 1 is a longitudinal section of a boat embodying my invention.

Fig. 2 is a plan view of said boat.

Fig. 3 is a cross sectional view taken on line 3—3 of Fig. 2.

Fig. 4 is a side view of one of the traction belt elements and a portion of one of the traction belt chains in engagement therewith.

Fig. 5 is a rear view of said traction belt element showing links of the traction chains engaging therewith.

Fig. 6 is a front view of said traction belt element.

In the drawing, 1 indicates the hull of the boat, the bottom of which is provided with upwardly extending longitudinal grooves 2 and 3 in which are respectively mounted traction belts 4 and 5 and propellers 6 and 7. Each traction belt includes a plurality of parallel chains 8 which travel over sprockets 9 10 and 11 journaled in the bottom of the boat within said grooves so that the lower reach of the traction belts rest just below the bottom of the boat hull. Rollers 12 and 13 engage the lower reach of the chains of the traction belts between the sprockets 9 and 10 and the sprockets 10 and 11 and maintain the lower reach of the belts straight. A swinging frame 14 is pivotally mounted on the shaft 15 of each sprocket 11, on the outer end of which frames are bearings 16 in which are journaled the outer end sections 17 of the propeller shafts 18 on the outer end of which shaft sections are secured the propellers 6 and 7 respectively. Each propeller shaft comprises two sections 17 and 19, jointed together by universal joints 20. The upper end of each section 19 of each propeller shaft is jointed by a universal joint 21 to the drive shaft 22 of an engine 23. Each engine 23 includes a traction drive shaft 24 which may be clutched to and released from the engine drive shaft 22 by a clutch 25. On each traction drive shaft 24 is secured a beveled gear 26 which meshes with a beveled gear 27 suitably journaled in bearing 28 on the upper wall of each groove 2 and 3. Each beveled gear 27 is formed with a gear 29 which meshes with a pair of gears 30 and 31, respectively secured to the upper end of vertical shafts 32 and 33 journaled in bearings 34 secured to the bottom of the boat within the grooves 2 and 3. On the lower end of each shaft 32 and 33 is secured a beveled gear 35 and 36 which respectively mesh with beveled gears 37 and 38 secured on the sprocket shafts 40 of the sprockets 10, which shafts are journaled in bearings 41 secured to the bottom of the boat within pockets 42 and 43 of the grooves 2 and 3, within which pockets are located the beveled gears 35 to 38 inclusive. Traction elements 45 are mounted on the traction belts 4 and 5. Said traction elements each comprise a pair of prongs 46, which extend outwardly between the chains 8 of said traction belts, and a plate 47 extending at right angles to said prongs on the inner side of said chains, on which plate are formed knuckles 48 through which extend certain of the link pivots 49 (Fig. 4). The traction elements 45 hold the chains of the traction belts 4 and 5 parallel and give the belts rigidity and solidity. Stops 50 are provided for limiting the downward movement of the frames 14 and propeller 6 and 7.

In deep water the propellers 6 and 7 rest below the bottom of the boat so that they may propel the boat. When the boat is propelled the prongs 46 engaging the water swing the traction elements 45 on their pivots 49 and rest against the underside of the lower reach of the traction belts so that they offer no resistance in the water to the forward movement of the boat. When the bottom of the boat rests upon the bottom of the river the outer end of the frames 14, engaging the river bottom, are swung upward, and the propellers 6 and 7 swung upward into the grooves 2 and 3 so that they may not engage the river bottom. Upon driving the traction belts so that their lower reaches travel forwardly the boat may be driven over the river bottom, the prongs 46 engaging the river bottom in a vertical position with the plates 47 engaging the links and holding the prongs vertical.

The boat may be steered in deep water by relative operation of the engines and the propellers 6 and 7. The boat may be steered over the river bottom by the relative operation of the engines and traction belts 4 and 5.

Having described my invention, I claim:

1. In combination with the hull of a boat, propelling means and traction means for conveying the boat over the river bottom, and automatic means for withdrawing the propellers of said propelling means out of the water above the bottom of said hull when the boat travels over the river bottom.

2. In combination, a boat hull provided with upwardly extending longitudinal grooves in its bottom, an endless traction belt mounted in each groove, means for driving said traction belts, a swinging frame mounted in the bottom of the boat in each of said grooves, a propeller mounted on each swinging frame so that the frames may swing the propellers into said grooves as the boat travels over the river bottom.

3. In combination with a boat hull, traction means for conveying the hull over the river bottom, said traction means including traction elements adapted to swing into a horizontal position as the boat travels in deep water and adapted to rest vertical to engage the river bottom when the boat travels over the river bottom, and means for propelling the boat in deep water.

In testimony whereof I affix my signature.

JACK B. MacDONALD.